Jan. 23, 1968  L. B. VENABLE  3,365,251
SEAL ASSEMBLY FOR ANTIFRICTION BEARINGS
Filed April 28, 1966
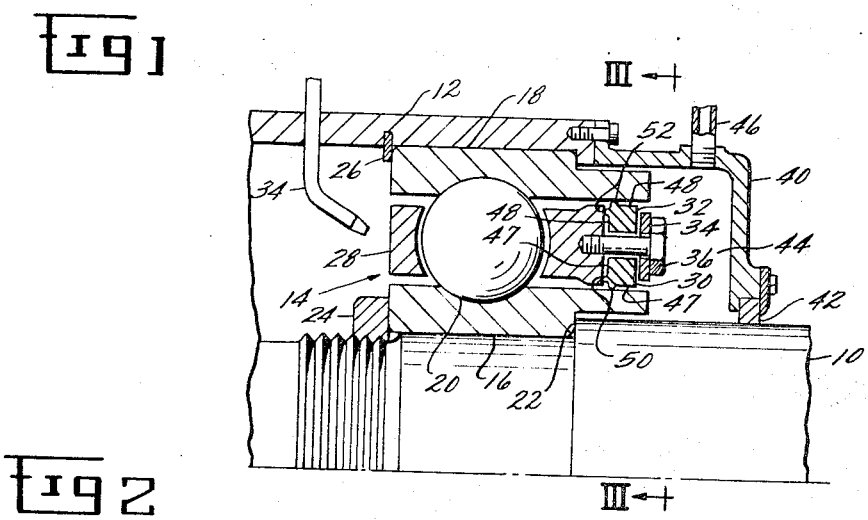
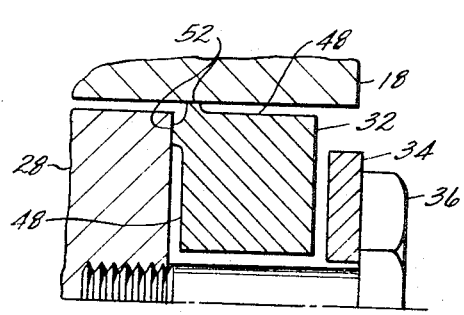
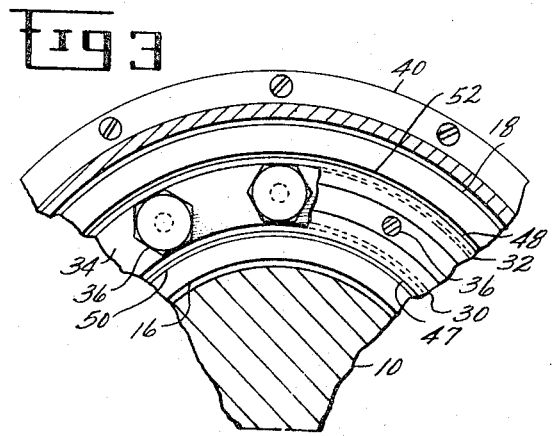
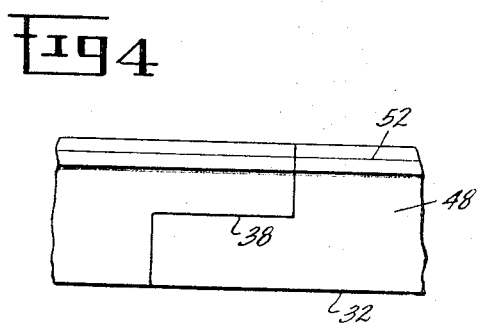
INVENTOR.
LAWRENCE B. VENABLE
BY
ATTORNEY

United States Patent Office 3,365,251
Patented Jan. 23, 1968

3,365,251
SEAL ASSEMBLY FOR ANTIFRICTION BEARINGS
Lawrence B. Venable, Cincinnati, Ohio, assignor to General Electric Company, a corporation of New York
Filed Apr. 28, 1966, Ser. No. 546,011
5 Claims. (Cl. 308—187.2)

The present invention relates to seal assemblies for antifriction bearings and more particularly to such a seal assembly that provides low wear.

It is common practice to provide seals for preventing leakage of lubricating fluid from antifriction bearings that support rotating members. Generally such seals are fixed with respect to a stationary bearing element and sealingly engage the rotating member.

With this arrangement the velocity of the seal relative to the element it engages is the tangential velocity of the rotating member at the point of engagement. During high speed operation of the rotating member, this relative velocity may be at an extremely high level, thus significantly increasing the wear on the seal.

Accordingly, it is an object of the present invention in an antifriction bearing to reduce the velocities of seals relative to elements they sealingly engage to thereby minimize wear and to do so in a simple, economical fashion.

These ends in a broad sense are obtained by providing an antifriction bearing and seal assembly comprising relatively rotatable inner and outer races with a plurality of antifriction elements guided between the races for rolling circumferential movement. A cage is provided for maintaining the antifriction elements in mutually spaced relation during such rotation, the relative velocity of the cage being intermediate that of the races. A first seal ring is provided that is sealingly engageable with the cage and one of the races, the seal ring being rotatable relative to the cage and one of the races. A second seal ring sealingly engageable with the cage and the other of the races is provided, the second ring being rotatable relative to the cage and the other race. The seal rings are responsive to exterior urging to sealingly engage the bearing elements such that the frictional forces exerted on the seal rings control rotation thereof to a rate intermediate that of the elements sealingly engaged. The velocities of the seal rings relative to the elements sealingly engaged are thereby minimized to reduce wear.

The above and other related objects and features of the invention will be apparent from a reading of the following description of the disclosure found in the accompanying drawing and the novelty thereof pointed out in the appended claims.

In the drawing:

FIGURE 1 shows a longitudinal section of an antifriction bearing and seal assembly used to journal a shaft in a housing;

FIGURE 2 is an enlarged fragmentary view of the seal assembly shown in FIGURE 1;

FIGURE 3 is a view taken on lines III—III of FIGURE 1; and

FIGURE 4 is a fragmentary view of a seal shown in FIGURE 2.

FIGURE 1 shows a shaft 10 journaled in a housing 12 by means of a bearing assembly 14. The bearing assembly 14 comprises an inner race 16 and an outer race 18 with a plurality of antifriction elements 20 disposed therebetween. The inner race 16 is telescoped over the shaft 10 and locked against a shoulder 22 by a nut 24. The outer race is secured to the housing 12 by a snap ring 26.

The antifriction elements 20 are herein illustrated as balls which are guided for rolling circumferential movement between the inner and outer races and maintained in mutual, spaced relationship by a cage 28.

The bearing assembly 14 is lubricated by means of a conduit 34 which receives lubricating fluid from a suitable source and directs it at the bearing assembly 14. In accordance with the present invention, the bearing assembly 14 is provided with a seal assembly for minimizing, if not eliminating, leakage of lubricating fluid to its opposite side.

The seal assembly comprises first and second seal rings 30, 32 of suitable seal material which are free to slide axially for sealing engagement with the cage 28. Preferably, the seal rings 30, 32 are carbon seals to withstand high temperatures sometimes associated with high speed operation. A plate 34 is secured to the cage 28 by a series of screws 36 retains the rings 30, 32 in the bearing assembly (FIGURE 3). The ring 32 is split in an offset fashion at 38 (FIGURE 4) to permit it to expand into sealing engagement with an outer race 18. Ring 30 is similarly split to permit it to contract into sealing engagement with the inner race 16.

A cap 40 extends from the housing 12 and has a suitable seal 42 to provide a chamber 44 which is pressurized through conduit 46 to a level such that the seal rings 30, 32 are urged into sealing engagement.

In operation, the cage 28, which travels circumferentially with the balls 20 has a tangential velocity approximately one-half the velocity of the inner race 16. The frictional forces exerted on the ring 32 by the cage 28 and outer race 18 are controlled to cause it to rotate at a rate between that of the cage 28 and the stationary outer race 32. The frictional forces may be controlled by providing reliefs 47, 48 having predetermined areas, on the sealing surfaces of the seal rings 30, 32 respectively. These reliefs permit the pressure acting on the exterior of the seal rings to oppose, with a predetermined force, the force urging the seal rings 30, 32 into sealing engagement with the cage 28 and the inner and outer races 16, 18. The reliefs 47, 48 additionally provide sealing engagement by ribs 50, 52 to maximize the sealing efficiency of the seal rings 30, 32.

As the ring 32 rotates, centrifugal force expands the ring, thus increasing friction exterted by the outer race 18. This frictional force is reduced by providing a relief 48 of greater area on the surface engaging the outer race 18 than on the surface engaging the cage 28, as shown in FIGURE 2. Preferably, the area of the reliefs 48 are such that the frictional forces exerted on the ribs 52 by the cage 28 and outer race 18 are equal for a given operating condition.

The ring 30 rotates at a speed intermediate that of the cage 28 and inner race 16. Centrifugal force, however, expands the ring 30 to decrease the frictional force exerted thereon by the inner race 16. Accordingly, the surface engaging the inner race 16 has a relief 48 of smaller area than the surface engaging the cage 28, to achieve equal frictional forces exerted on the ribs 50 by the cage 28 and the inner race 16.

Equal frictional forces exerted on the ring 32 will cause it to travel circumferentially at such a rate that the relative velocity of the ring 32 with respect to the cage 28 and outer race 18, at the point of sealing engagement, is substantially one-half the relative velocity of the cage 28 and the outer race 18, taken from the same point of engagement. The relative velocity of the ring 30 with respect to the cage 28 and inner race 16 is also one-half the relative velocity of the cage 28 and the inner race 16 at the point of sealing engagement.

With the above velocity relationships, the relative velocity of the rings with respect to the elements they sealingly engage is greatly minimized and is almost one-fourth the relative velocity experienced when a stationary seal is used to sealingly engage the rotating shaft 10.

The seal assembly thus described has great utility in providing an effective low wear seal for high speed rotating shafts by greatly reducing the velocity of a seal with respect to a member it engages.

Modifications of the described embodiment will occur to those skilled in the art and the scope of the invention is to be derived solely from the following claims.

Having thus described the invention, what is claimed as novel and desired to be secured by Letters Patent of the United States is:

1. An antifriction bearing and seal assembly comprising,
   relatively rotatable inner and outer races,
   a plurality of antifriction elements guided between said races for rolling circumferential movement,
   a cage maintaining said antifriction elements in mutually spaced relation during such rotation, the relative velocity of said cage being intermediate that of said races,
   a first seal ring sealingly engageable with said cage and one of said races, said seal ring being rotatable relative to said cage and one of said races,
   a second seal ring sealingly engageable with said cage and the other of said races, said second ring being rotatable relative to said cage and said other race,
   said seal rings being responsive to exterior urging to sealingly engage said bearing elements such that the frictional forces exerted on said seal rings control rotation thereof to a rate intermediate that of the elements sealingly engaged,
   whereby the velocities of the seal rings relative to the elements sealingly engaged are minimized to reduce wear.

2. An antifriction bearing and seal assembly as in claim 1, in further combination with,
   means for urging said seal rings into sealing engagement with said elements such that substantially equal frictional forces are exerted on said seal rings by the elements they sealingly engage,
   whereby the relative velocities of said seal rings with respect to the elements they sealingly engage are substantially one-half the relative velocity of one element sealingly engaged with respect to the other element sealingly engaged.

3. An antifriction bearing and seal assembly as in claim 1 wherein,
   said inner and outer races at one end extend axially beyond said cage,
   said first and second seal rings are disposed between said inner and outer races and are freely displaceable axially to sealingly engage said cage,
   said first and second seal rings are split to permit radial expansion of one and radial contraction of the other to respectively sealingly engage the inner diameter of said outer race and the outer diameter of said inner race.

4. An antifriction bearing and seal assembly as in claim 3, in further combination with,
   means for loosely retaining said seal rings within the axial extensions of said inner and outer races,
   means for urging said seal rings into sealing engagement with said cage and said inner and outer races.

5. A combination as in claim 3 wherein,
   said means for urging said seal rings into sealing engagement comprises,
   means pressurizing the exterior of said seal rings for displacing them axially into sealing engagement with said cage and for radially expanding one of said rings into sealing engagement with the outer race and radially contracting the other of said seal rings into sealing engagement with said inner race,
   the sealing surfaces of each of said seal rings are relieved to define ribs having a relatively narrow width for sealingly engaging said cage and one of said races, the area of said reliefs being such that said seal rings exert equal forces on said cage and one of said races when said seal rings rotate at a predetermined rate,
   whereby equal frictional forces are exerted on said ribs by the elements they sealingly engage.

References Cited

UNITED STATES PATENTS

| | | | |
|---|---|---|---|
| 2,913,289 | 11/1959 | Stevenson | 308—187.1 |
| 3,113,812 | 12/1963 | Dotter | 308—187.1 |

MARTIN P. SCHWADRON, *Primary Examiner.*

ROBERT A. DUA, *Examiner.*